United States Patent
Nakayama

(10) Patent No.: US 9,900,606 B2
(45) Date of Patent: Feb. 20, 2018

(54) COMPRESSION DEVICE AND COMPRESSION METHOD

(71) Applicant: SAMSUNG DISPLAY CO., LTD., Yongin, Gyeonggi-Do (KR)

(72) Inventor: Shintaro Nakayama, Yokohama (JP)

(73) Assignee: Samsung Display Co., Ltd., Yongin-si, Gyeonggi-do (KR)

( * ) Notice: Subject to any disclaimer, the term of this patent is extended or adjusted under 35 U.S.C. 154(b) by 280 days.

(21) Appl. No.: 14/552,881

(22) Filed: Nov. 25, 2014

(65) Prior Publication Data

US 2015/0145879 A1    May 28, 2015

(30) Foreign Application Priority Data

Nov. 27, 2013   (JP) .................................. 2013-245380

(51) Int. Cl.
*G06K 9/36* (2006.01)
*H04N 19/436* (2014.01)
*H04N 19/426* (2014.01)

(52) U.S. Cl.
CPC ......... *H04N 19/436* (2014.11); *H04N 19/428* (2014.11)

(58) Field of Classification Search
USPC ....... 382/232, 233, 240, 239, 236, 243, 305; 341/51; 345/555; 347/3; 358/434, 515; 375/E7.013, 240.05, E7.266, 240.03; 381/98, 103, 106; 707/812, 968
See application file for complete search history.

(56) References Cited

U.S. PATENT DOCUMENTS

| | | | |
|---|---|---|---|
| 6,818,961 B1 * | 11/2004 | Rizzo .................... | B82Y 25/00 257/421 |
| 7,236,637 B2 * | 6/2007 | Sirohey ................. | G06T 3/4084 375/E7.013 |
| 2009/0245391 A1 * | 10/2009 | Youn .................... | H04N 19/105 375/240.27 |
| 2013/0093779 A1 | 4/2013 | Lyons et al. | |

FOREIGN PATENT DOCUMENTS

| | | |
|---|---|---|
| JP | 2001-022553 | 1/2001 |
| JP | 2007-178850 | 7/2007 |
| JP | 2010-011386 | 1/2010 |
| JP | 2014-075631 | 4/2014 |
| WO | WO 2007/046032 A1 | 4/2007 |

* cited by examiner

*Primary Examiner* — Anh Do
(74) *Attorney, Agent, or Firm* — Lee & Morse, P.C.

(57) ABSTRACT

A compression device includes a first compressor section, a second compressor section, and a selector. The first compressor section outputs a first compression result or a second compression result as a middle compression result. The first compression result includes a first compression pixel value generated by compressing pixel values of compression target pixels without referring to pixel values of pixels belonging to a line different from a current line. The second compression result includes a second compression pixel value generated by compressing pixel values of the compression target pixels based on a correlation among pixel values of the compression target pixels and reference approximate pixel values. The second compressor section outputs a third compression result based on the correlation among the pixel values of the compression target pixels. The selector outputs one of the middle compression result or the third compression result as a final compression result.

20 Claims, 14 Drawing Sheets

FIG. 8

| Index | Range of input values | | Approximate value | Index | Range of input values | | Approximate value |
|---|---|---|---|---|---|---|---|
| 0 | 0 | 16 | 0 | 16 | 512 | 544 | 528 |
| 1 | 17 | 49 | 33 | 17 | 545 | 577 | 561 |
| 2 | 50 | 82 | 66 | 18 | 578 | 610 | 594 |
| 3 | 83 | 115 | 99 | 19 | 611 | 643 | 627 |
| 4 | 116 | 148 | 132 | 20 | 644 | 676 | 660 |
| 5 | 149 | 181 | 165 | 21 | 677 | 709 | 693 |
| 6 | 182 | 214 | 198 | 22 | 710 | 742 | 726 |
| 7 | 215 | 247 | 231 | 23 | 743 | 775 | 759 |
| 8 | 248 | 280 | 264 | 24 | 776 | 808 | 792 |
| 9 | 281 | 313 | 297 | 25 | 809 | 841 | 825 |
| 10 | 314 | 346 | 330 | 26 | 842 | 874 | 858 |
| 11 | 347 | 379 | 363 | 27 | 875 | 907 | 891 |
| 12 | 380 | 412 | 396 | 28 | 908 | 940 | 924 |
| 13 | 413 | 445 | 429 | 29 | 941 | 973 | 957 |
| 14 | 446 | 478 | 462 | 30 | 974 | 1006 | 990 |
| 15 | 479 | 511 | 495 | 31 | 1007 | 1023 | 1023 |

FIG. 9

| Index | Range of input values | | Approximate value | Index | Range of input values | | Approximate value |
|---|---|---|---|---|---|---|---|
| 0 | 0 | 33 | 0 | 8 | 510 | 577 | 544 |
| 1 | 34 | 101 | 68 | 9 | 578 | 645 | 612 |
| 2 | 102 | 169 | 136 | 10 | 646 | 713 | 680 |
| 3 | 170 | 237 | 204 | 11 | 714 | 781 | 748 |
| 4 | 238 | 305 | 272 | 12 | 782 | 850 | 816 |
| 5 | 306 | 373 | 340 | 13 | 851 | 919 | 885 |
| 6 | 374 | 441 | 408 | 14 | 920 | 988 | 954 |
| 7 | 442 | 509 | 476 | 15 | 989 | 1023 | 1023 |

FIG. 13

| Index | Range of input values | | Approximate value | Index | Range of input values | | Approximate value |
|---|---|---|---|---|---|---|---|
| 14 | −1023 | −97 | −128 | 1 | 1 | 1 | 1 |
| 12 | −96 | −49 | −64 | 3 | 2 | 3 | 2 |
| 10 | −48 | −25 | −32 | 5 | 4 | 9 | 4 |
| 8 | −24 | −11 | −16 | 7 | 10 | 23 | 16 |
| 6 | −10 | −4 | −4 | 9 | 24 | 47 | 32 |
| 4 | −3 | −2 | −2 | 11 | 48 | 95 | 64 |
| 2 | −1 | −1 | −1 | 13 | 96 | 1023 | 128 |
| 0 | 0 | 0 | 0 | | | | |

FIG. 14

| Index | Range of input values | | Approximate value | Index | Range of input values | | Approximate value |
|---|---|---|---|---|---|---|---|
| 6 | -1023 | -11 | -16 | 1 | 1 | 2 | 1 |
| 4 | -10 | -3 | -4 | 3 | 3 | 9 | 4 |
| 2 | -2 | -1 | -1 | 5 | 10 | 39 | 16 |
| 0 | 0 | 0 | 0 | 7 | 40 | 1023 | 64 |

COMPRESSION DEVICE AND COMPRESSION METHOD

CROSS-REFERENCE TO RELATED APPLICATION

Japanese Patent Application No. 2013-245380, filed on Nov. 27, 2013, and entitled, "Compression Device and Compression Method," is incorporated by reference herein in its entirety.

BACKGROUND

1. Field

One or more embodiments described herein relate to a compression device and a compression method.

2. Description of the Related Art

An image data compression technique may be performed in a display module having a frame memory. This technique may reduce costs by allowing the frame memory to have reduced capacity or by reducing the width of internal communication data.

SUMMARY

In accordance with one or more embodiments, a compression device includes: a memory to store reference approximate pixel values as approximate pixel values of reference pixels belonging to a second line adjacent to a first line including compression target pixels of a plurality of pixels; a first compressor section to output a result corresponding to one of a first compression result or a second compression result as a middle compression result, the output result having a predetermined compression error, the first compression result including a first compression pixel value generated by compressing pixel values of the compression target pixels without referring to pixel values of pixels belonging to a line different from the first line, and the second compression result including a second compression pixel value generated by compressing pixel values of the compression target pixels based on a correlation among pixel values of the compression target pixels and the reference approximate pixel values; a second compressor section to output a third compression result based on the correlation among the pixel values of the compression target pixels; and a selector to output one of the middle compression result or the third compression result as a final compression result, the final compression result corresponding to the one of the middle compression result or the third compression result having a predetermined error.

The first compressor section may include a first compressor to generate the first compression result; a second compressor to generate the second compression result; and a first compressor selector to receive the first and second compression results and to output the middle compression result, wherein the first compression result includes first approximate pixel values corresponding to approximate pixel values of the first compression pixel values and compression errors between the first approximate pixel values and pixel values of the compression target pixels.

The second compression result may include reference differences corresponding to differences between pixel values of the compression target pixels and the reference approximate pixel values, second approximate pixel values as approximate pixel values of the second compression pixel values, and compression errors between pixel values of the compression target pixels and the second approximate pixel values. The second compressor may compress pixel values of the compression target pixels based on the reference differences to generate the second compression pixel values.

The second compressor section may include a plurality of third compressors to perform compression based on the correlation among pixel values of the compression target pixels; and a second compressor selector to output one result of compression results of the third compressors as the third compression result, wherein the second compressor selector is to output one of the compression results of the third compressors having a predetermined compression error.

The second compressor section may include a determiner to determine a correlation pattern of pixel values of the compression target pixels; a third compressor to generate a first sub compression result; a fourth compressor to generate a second sub compression result; and a second compressor selector to output one of the first or second sub compression results as the third compression result, the output result being a predetermined compression result. The first sub compression result may include: fourth compression pixel values obtained by compressing pixel values of the compression target pixels compressed according to the correlation pattern, fourth approximate pixel values as approximate pixel values of the fourth compression pixel values, and compression errors between pixel values of the compression target pixels and the fourth approximate pixel values.

The determiner may calculate an adjacent difference value between pixel values of two adjacent compression target pixels, and determine the correlation pattern based on the adjacent difference value.

The third compressor may calculate an average value of pixel values of first compression target pixels having a predetermined correlation, and compress the average value, without referring to pixel values of remaining pixels other than the first compression target pixels, to generate compression pixel values of the first compression target pixels. The third compressor may not perform compression when the determiner determines that the correlation pattern does not exist.

The second sub compression result may include fifth pixel values obtained by compressing pixel values of the compression target pixels, fifth approximate pixel values as approximate pixel values of the fifth pixel values, and compression errors between pixel values of the compression target pixels and the fifth approximate pixel values.

The fourth compressor may compress pixel values of two compression target pixels at respective ends, without referring to pixel values of other pixels, to generate compression pixel values of the two compression target pixels at the respective ends, and approximate pixel values of remaining compression target pixels of the compression target pixels, other than the two compression target pixels at the respective ends, may be generated by linearly interpolating approximate pixel values of compression pixel values of the two compression target pixels at the respective ends.

The pixel values of the reference pixels may be compressed prior to pixel values of the compression target pixels. The compression target pixels may be successive compression target pixels. The compression error may be based on a difference between a pixel value and an approximate pixel value obtained by de-compressing a compression pixel value of the pixel value.

In accordance with another embodiment, a compression method includes storing reference approximate pixel values as approximate pixel values of reference pixels corresponding to a second line adjacent to a first line to which compression target pixels of a plurality of pixels belong;

generating a first compression result including a first compression pixel value generated by compressing pixel values of the compression target pixels without referring to pixel values of pixels, belonging to a line different from the first line; generating a second compression result including a second compression pixel value generated by compressing pixel values of the compression target pixels using a correlation among pixel values of the compression target pixels and the reference approximate pixel values; outputting one of the first and second compression results as a middle compression result, the output compression result having a first predetermined error; outputting a third compression result compressed using a correlation among pixel values of the compression target pixels; and outputting one of the middle compression result or the third compression result as a final compression result, the output one of the middle or third compression result having a second predetermined error.

In accordance with another embodiment, a compression device includes a first compressor section to output a first compression result or a second compression result as a middle compression result, wherein (a) the first compression result includes a first compression pixel value generated by compressing pixel values of compression target pixels without referring to pixel values of pixels belonging to a line different from a current line, and (b) the second compression result including a second compression pixel value generated by compressing pixel values of the compression target pixels based on a correlation among pixel values of the compression target pixels and reference approximate pixel values; a second compressor section to output a third compression result based on the correlation among the pixel values of the compression target pixels; and a selector to output one of the middle compression result or the third compression result as a final compression result.

The first compressor section may output one of the first compression result or the second compression result having a predetermined compression error. The selector may output one of the middle compression result or the third compression result having a predetermined error.

The device may include a memory to store the reference approximate pixel values as approximate pixel values of reference pixels belonging to the line different from the current line including the compression target pixels. The pixel values of the reference pixels may be compressed prior to pixel values of the compression target pixels.

The first compressor section may includes a first compressor to generate the first compression result; a second compressor to generate the second compression result; and a first compressor selector to output the middle compression result, the first compression result including first approximate pixel values corresponding to approximate pixel values of the first compression pixel values and compression errors between the first approximate pixel values and pixel values of the compression target pixels, the second compression result including reference differences corresponding to differences between pixel values of the compression target pixels and the reference approximate pixel values, second approximate pixel values as approximate pixel values of the second compression pixel values, and compression errors between pixel values of the compression target pixels and the second approximate pixel values, and wherein the second compressor is to compress pixel values of the compression target pixels based on the reference differences to generate the second compression pixel values.

The second compressor section may include a plurality of third compressors to perform compression based on the correlation among pixel values of the compression target pixels; and a second compressor selector to output one of compression results of the third compressors as the third compression result, wherein the second compressor selector is to output one of the compression results of the third compressors having a predetermined compression error.

BRIEF DESCRIPTION OF THE DRAWINGS

Features will become apparent to those of skill in the art by describing in detail exemplary embodiments with reference to the attached drawings in which:

FIGS. 8 and 9 illustrate examples of tables for use by a compressor;

FIGS. 13 and 14 illustrate examples of tables for use by a compressor;

DETAILED DESCRIPTION

Figure 1:
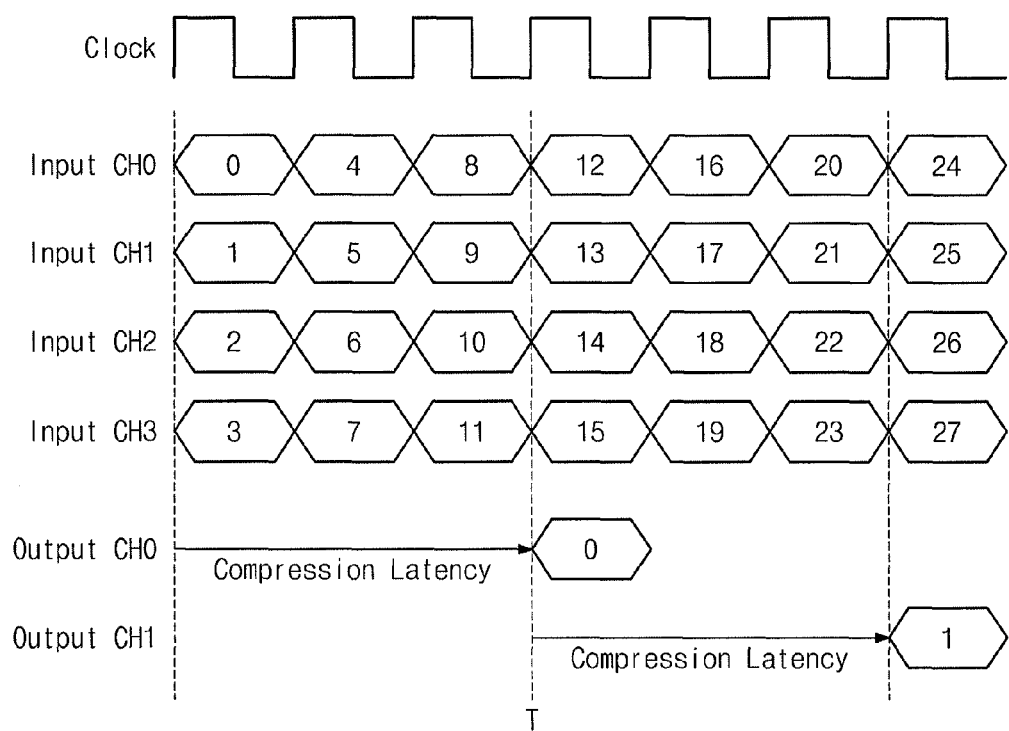
FIG. 1 illustrates a compression method.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

In accordance with one embodiment, a block boundary may correspond to the case where image data is divided into a plurality of blocks and compression is performed by a block, to thereby cause a decrease in image quality after compression.

FIG. 1 illustrates a compression method in which a pixel value of a compression target pixel is compressed based on a compression result of a pixel processed from among pixels belonging to the same line.

Referring to FIG. 1, when pixel values 0 through 3 of pixels are compressed in real time depending on a clock signal, for example, compression about the pixel values 0 through 3 is completed at T shown in FIG. 1. When a pixel value of a compression target pixel is compressed based on a compression result of a pixel, processed, from among pixels belonging to the same line, it may be difficult to compress data in real time due to latency.

In accordance with another compression method, compression is not performed based on a compression result of a pixel processed from among pixels corresponding to the same line. Also, to prevent a decrease in the quality of images after compression, image data is compressed depending on a compression result of a pixel processed from among pixels corresponding to a previous line, not the same line.

Figure 2:
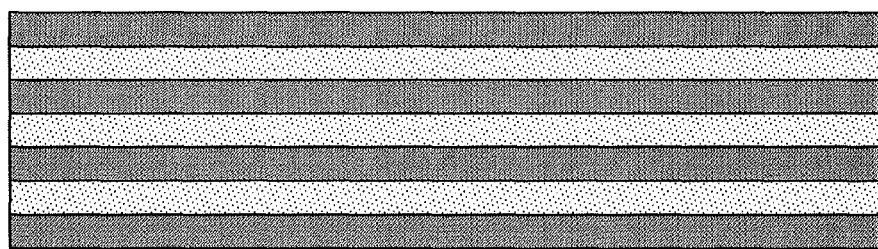
FIG. 2 illustrates another compression method.

Referring to FIG. 2, when compression is performed depending on a compression result of a pixel processed from among pixels corresponding to a previous line as illustrated in FIG. 2, deterioration of an image is seen by a user when an image after compression is displayed on a display screen. The reason is that correlation among pixel values of pixels corresponding to an adjacent line does not exist and correlation among pixel values of pixels corresponding to the same line is low.

In accordance with one embodiment of a compression method, a pixel value of a compression target pixel is compressed using pixel values of pixels corresponding to the same line, as well as compression results of pixels processed from among pixels corresponding to a previous line, e.g., the line just before a current line.

Figure 3:
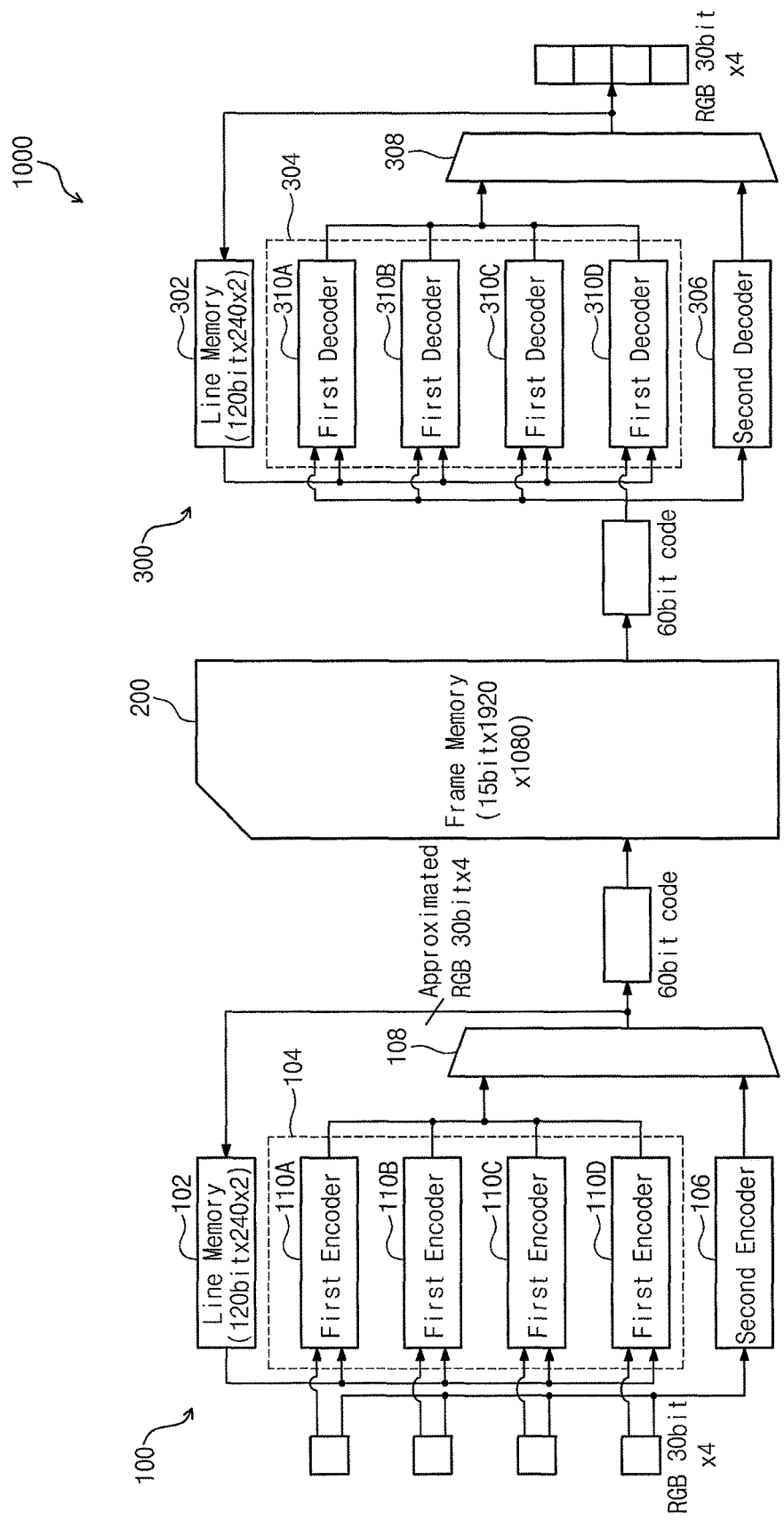
FIG. 3 illustrates an embodiment of an image data processing system.

FIG. 3 illustrates an embodiment of an image data processing system 1000 which includes a compression device 100 for performing a processing operation based on one or more embodiments of the compression method described herein. The processing system 100 also includes a frame memory 200 for storing a compression result from the compression device 100 and a de-compression device 300 for de-compressing a compression result read from the frame memory 200.

Image data corresponding to a predetermined number of (e.g., four) pixels is provided to the compression device 100. The compression device 100 outputs a compression result including a compression code corresponding to compressed pixel values of the four pixels. The compression code may have a predetermined number of bits, e.g., 60 bits.

In accordance with one embodiment, a compression device may output a compression result including a compression code corresponding to one pixel. Also, in FIG. 3, the compression device 100 compresses 120 bits to 60 bits (compression rate of 50%). In other embodiments, the compression device may compress data with another predetermined compression rate, e.g., one different from 50%.

In accordance with one embodiment, a pixel value of each pixel may include 10-bit red (R) data, 10-bit green (G) data, and 10-bit blue (B) data. That is, a pixel value of each pixel may be expressed with 30-bit data. In another embodiment, each pixel may be expressed with a different number of bits.

Also, in one embodiment four pixels processed by the compression device 100 are compression target pixels that correspond to the same line and are sequential. In another embodiment, the compression device may process image data indicating pixel values of a plurality of pixels. The compression device 100 and the de-compression device 300 of the image data processing system 1000 of FIG. 3 will now be described. The compression device 100 includes a memory 102, a first compression unit 104, a second compression unit 106, and a selection unit 108. In the compression device 100, for example, processing based on a compression is performed by the first compression unit 104, second compression unit 106, and selection unit 108.

The compression device 100 may include a central processing unit (CPU) and/or various processing circuits, and may include a control unit for controlling the overall operations of the compression device 100. Additionally, or alternatively, the compression device 100 may be controlled by an external control device that performs the same functions of the control unit.

The memory 102 stores such a pixel value that a compressed pixel value of a pixel, corresponding to a second line adjacent to a line (first line) corresponding to a compression target pixel, is de-compressed. Compression about a pixel value of a pixel corresponding to the second line precedes compression about a pixel value of a pixel corresponding to the first line.

In accordance with one embodiment, a compression pixel value of a pixel may correspond to a value obtained by compressing a pixel value of the pixel. An approximate pixel value of a pixel may correspond to a value obtained by de-compressing a compression pixel value of the pixel.

The memory 102 may be a line memory that stores pixel values of pixels corresponding to one or two lines, for example.

The first compression unit 104 compresses a pixel value of a pixel by means of a pixel value of a compression target pixel and an approximate pixel value stored at the memory 102, for example. In FIG. 3, the first compression unit 104 contains four compressors 110A through 110D (labeled "first encoder" in FIG. 3). Each of the compressors 110A through 110D processes a pixel value of a compression target pixel. The compressors 110A through 110D, or one of the compressors 110A through 110D, may be collectively referred to as a compressor 110.

The first compression unit 104 may include a linker to generate a compression code for connecting compressed pixel values output from a plurality of compressors 110 constituting the first compression unit 104. For example, the compressor 110 may output a compression result, in which a difference between a pixel value of a compression target pixel and first and second approximate pixel values is small, from among a first compression result and a second compression result every compression target pixel. The first and second approximate pixel values are approximate pixel values obtained by de-compressing the first and second compression results. When differences are identical to each other, the compressor 110 outputs one of the first compression result and the second compression result according to a predetermined rule (e.g., random).

In accordance with one embodiment, the first compression result is generated by compressing a pixel value of a compression target pixel without referring to a pixel value of another pixel. Also, a second compression result may be generated through compression performed based on a correlation between a pixel value of a compression target pixel and an approximate pixel value stored in the memory 102. For example, a compressed pixel value, an approximate pixel value, and an error may be included.

The second compression unit 106 compresses data by means of pixel values of four compression target pixels (e.g., synchronization with four pixels). The second compression unit 106 does not refer to an approximate pixel value stored in the memory 102. The second compression unit 106 includes a compressor (labeled "second encoder" in FIG. 3).

A compressor (labeled "second encoder" in FIG. 3) in the second compression unit 106 may include one or two or more sub-compressors that compress a pixel value of a compression target pixel by means of correlation among pixel values of four compression target pixels. In the event that a plurality of sub-compressors are included, the second compression unit 106 selects and outputs one of compression results from the sub-compressors. For example, the compression result having a predetermined (e.g., smallest) error from the sub-compressors may be selected. In another embodiment, a compression result may be selected which is different from the smallest error.

A compressor error may correspond to an error between an approximate pixel value, generated by de-compressing a compression result of a pixel value of a compression target pixel, and a pixel value of a compression target pixel.

The selection unit 108 outputs a compression result, having the predetermined (e.g., smallest) error, from among a compression from the first compression unit 104 and a compression result from the second compression unit 106 by the four compression target pixels. In the event that errors are identical to each other, the selection unit 108 outputs a compression result from the first compression unit 104 or a compression result from the second compression unit 106 according to a predetermined rule (e.g., randomly). The selection unit 108 is a multiplexer, for example.

A 60-bit compression code of a compression result from the selection unit 108 is stored in the frame memory 200, and an approximate pixel value is stored in the memory 102.

Pixel values of four pixels are provided to the compression device 100. Each of the first and second compression units 104 and 106 compresses pixel values by the four pixels. Four pixels correspond to compression target pixels.

Four pixels may be processed in parallel by corresponding compressors 110. A pixel value of a compression target pixel and an approximate pixel value read from the memory 102 are provided to the compressor 110. An output of the compressor 110 may include a compressed pixel value, an approximate pixel value, and a compression error, for example. One of four compressors 110 outputs a compression pixel value having a first predetermined number of bits, and others output a compression pixel value having a second predetermined number of bits. For example, the first predetermined number of bits may be 14 and the second predetermined number of bits may be 15.

Figure 4:
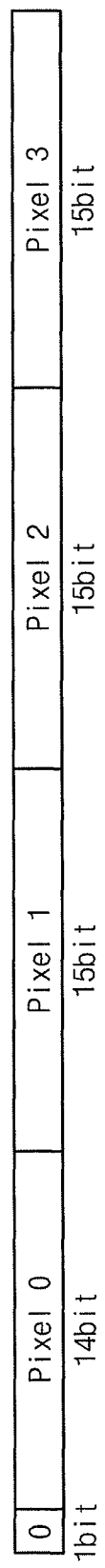
FIG. 4 illustrates a compression code according to one embodiment.

FIG. 4 illustrates an example of a compression code according to one embodiment. The compression code has 60 bits. The compression code contains compression pixel values from four compressors 110 and a 1-bit identifier. A compression error output from each of the four compressors 110 is added. The added compression error (e.g., a sum of errors from the four compressors 110) may correspond to a compression error of a first compression unit 104.

A second compression unit 106 simultaneously processes pixel values of four pixels. The second compression unit 106 outputs a 60-bit compression code, four approximate pixel values, and a compression error. A compression error from the second compression unit 106 is a sum of compression errors corresponding to four compression target pixels.

Comparison between a compression error from the first compression unit 104 and a compression error from the second compression unit 106 is performed by the selection unit 108. The selection unit 108 outputs one of a compression result of the first compression unit 104 and a compression result of the second compression unit 106. The output compression result may be, for example, the one having the smallest error.

Four approximate pixel values of the compression result from the selection unit 108 are written at a memory 102. Also, a 60-bit compression code of the compression result from the selection unit 108 is written at a frame memory 200. Writing of data at the memory 102 or the frame memory 200 may be controlled, for example, by a control unit or an external control device. Writing of data at the memory 102 or the frame memory 200 may be performed under control of the selection unit 108, for example.

Figure 5:
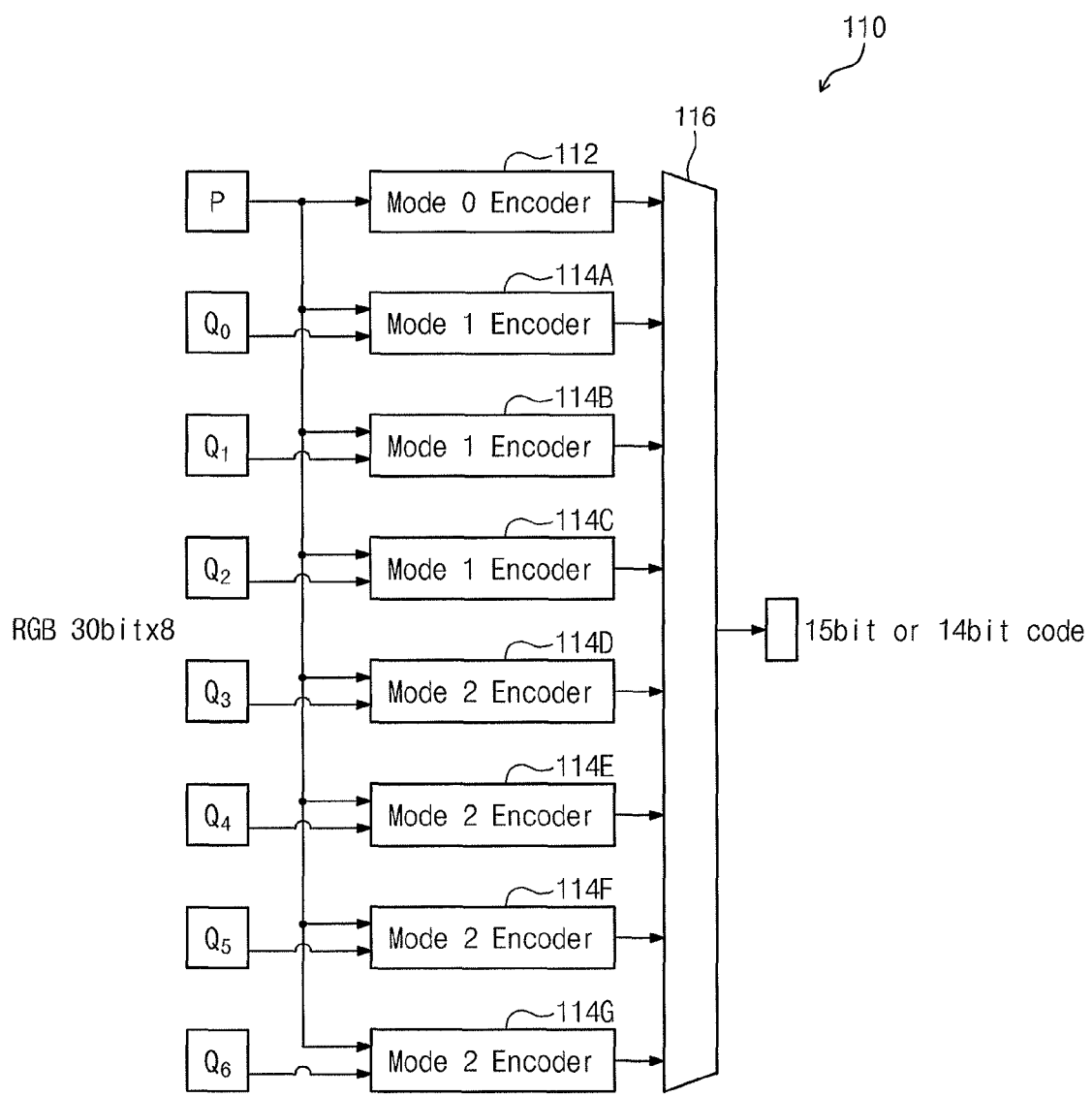
FIG. 5 illustrates a diagram showing an embodiment of a compressor.

FIG. 5 illustrates an embodiment of a compressor 110 constituting a first compression unit 104. In FIG. 5, P indicates a pixel value of a compression target pixel, and Qi (i being an integer of 0 through 6) indicates an approximate pixel value read from a memory 102.

The compressor 110 includes a first compressor 112, second compressors 114A through 114G (hereinafter, collectively referred to as "second compressor 114"), and a first selector 116. In FIG. 5, eight sub-compressors are shown to correspond to the first compressor 112 and the second compressors 114A through 114G. In another embodiment, a different number of sub-compressors may be included. For example, the compressor 110 may include the first compressor 112 and one or two or more second compressors 114.

Each of the first compressor 112 and the second compressors 114A through 114G that act as sub-compressors to output a compression pixel value, an approximate pixel value, and a compression error as a compression result.

The first selector 116 is a multiplexer, for example. The first selector 116 outputs one of eight compression results as a compression result of the compressor 110. The output result may be the one having the smallest error.

When (R, G, B) is a pixel value of a compression target pixel and (R', G', B') is an approximate pixel value, a compression error E from each of the first and second compressors 112 and 114A through 114G is expressed by Equation (1).

$$E = |R - R'| + |G - G'| + |B - B'| \quad (1)$$

A pixel value P of a compression target pixel is provided to the first and second compressors 112 and 114A through 114G, respectively. A corresponding approximate pixel value Qi is provided to each of the second compressors 114A through 114G. The approximate pixel value Qi may correspond to an approximate pixel value to be referred upon compressing of the pixel value P of the compression target pixel. A pixel corresponding to an approximate pixel value referred to upon compressing of the pixel value P of the compression target pixel may be referred to as a reference pixel.

Figure 6:
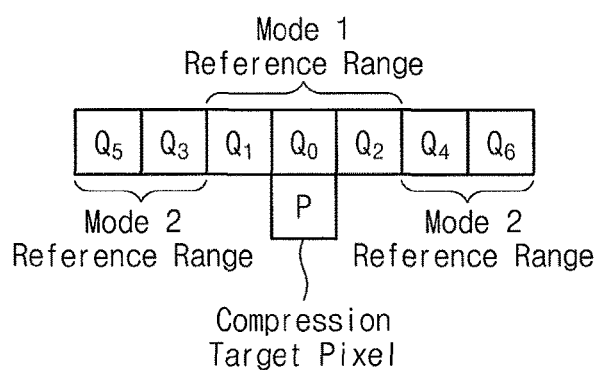
FIG. 6 illustrates examples of a compression target pixel and a reference pixel.

FIG. 6 illustrates a relationship between a compression target pixel and a reference pixel according to one embodiment. In FIG. 6, for illustrative purposes only, a reference range of a reference pixel is divided into Mode 1 and Mode 2 according to a position relationship between a compression target pixel and a reference pixel. Also, in FIG. 5, second compressors 114A through 114G are divided into Mode 1 Encoder and Mode 2 Encoder according to a reference range of Mode 1 and Mode 2 in FIG. 6. In another embodiments, a different relationship may exist between a compression target pixel and a reference pixel.

The first compressor 112 compresses a pixel value P of a compression target pixel without referring to a pixel value of another pixel. (Compressing a pixel value P of a compression target pixel without referring to a pixel value of another pixel may be referred to as direct compression.) The first compressor 112 outputs a pixel value compressed by direct compression, an approximate pixel value of a compression pixel, and a compression error as a compression result. (A compression result from the first compressor 112 may be referred to as first compression result.) The first compressor 112 may output a compression pixel value by quantizing a pixel value P of a compression target pixel.

Figure 7:
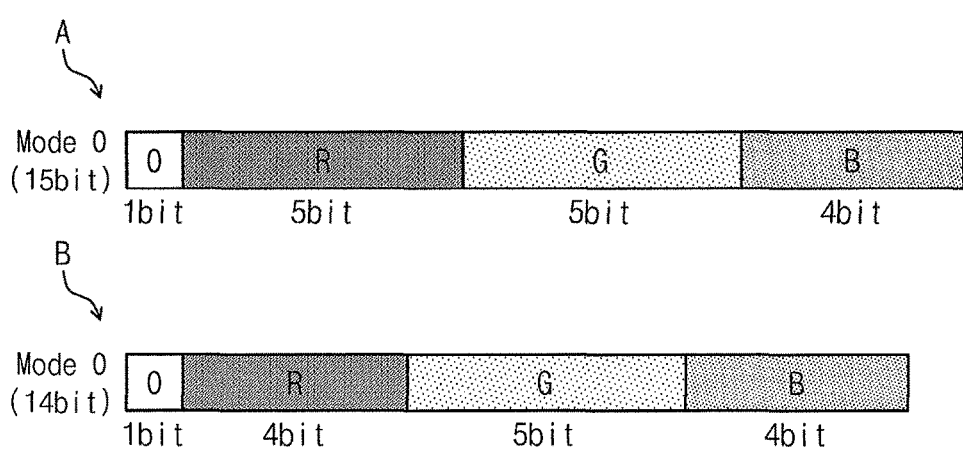
FIG. 7 illustrates an example of a compression pixel value.

FIG. 7 illustrates a compression pixel value from a first compressor 112 according to one embodiment. In FIG. 7, "A" indicates a compression pixel value when a first compressor 112 outputs a 15-bit compression pixel value, and "B" indicates a compression pixel value when a first compressor 112 outputs a 14-bit compression pixel value. In FIG. 7, R, G, and B indicate quantization indexes.

For example, quantization of the first compressor 112 is performed using a table (or database) stored in a storage medium (e.g., ROM) as follows:

(a) specify a range of an input value including a pixel value P of a compression target pixel, (b) determine an index corresponding to the specified range of the input value as a compression pixel value, and (c) determine an approximate value corresponding to the specified range of the input value as an approximate pixel value.

FIGS. 8 and 9 illustrate examples of tables that may be used for operating the first compressor 112 according to one embodiment. FIG. 8 illustrates an example of table that may be used when a compression pixel value is formed of five bits, as illustrated in FIG. 7. FIG. 9 illustrates an example of a table that may be used when a compression pixel value is formed of four bits, as illustrated in FIG. 9.

When a pixel value P of a compression target pixel is (R, G, B) (=(750, 250, 500)) and a 15-bit compression pixel value is output, the first compressor 112 may use the table in FIG. 8 with respect to R and G and may use the table in FIG. 9 with respect to B.

In FIG. 8, an index of R is 23 ("10111" in binary form) and an approximate pixel value of R may be 759. In FIG. 8, an index of G is 8 ("01000" in binary form) and an approximate pixel value of R is 264. In FIG. 9, an index of B is 7 ("0111" in binary) and an approximate pixel value of B is 476.

Thus, when a pixel value P of a compression target pixel is (R, G, B) (=(750, 250, 500)) and a 15-bit compression pixel value is output, the first compressor 112 outputs a compression pixel value of "0 10111 01000 0111" in binary form. Also, in the above-described case, the first compressor 112 outputs an approximate pixel value of (759, 264, 476). The foregoing quantizing method for pixel value P is merely illustrative and may be performed differently in other embodiments.

The second compressor 114 calculates a difference between a pixel value of a compression target pixel and an approximate pixel value stored in memory 102. For example, the second compressor 114 calculates a difference between a pixel value of a compression target pixel and a pixel value of a reference pixel. The difference may correspond to a value indicating a correlation between a pixel value of a compression target pixel and an approximate pixel value stored in the memory 102.

For example, the second compressor 114 calculates a difference D between a pixel value of a compression target pixel and a pixel value of a reference pixel as expressed by Equation 2. In Equation 2, P indicates a pixel value of a compression target pixel, and Q indicates a pixel value of a reference pixel, that is, an approximate pixel value stored in the memory 102.

$$D=P-Q \qquad (2)$$

The second compressor 114 outputs a compression pixel value corresponding to the difference D, an approximate pixel value corresponding to the compression pixel value, and a compression error as a compression result. A compression result from the second compressor 114 may be referred to as second compression result. The second compressor 114 may quantize the calculated difference D to output a compression pixel value corresponding to the calculated difference D.

Figure 10:
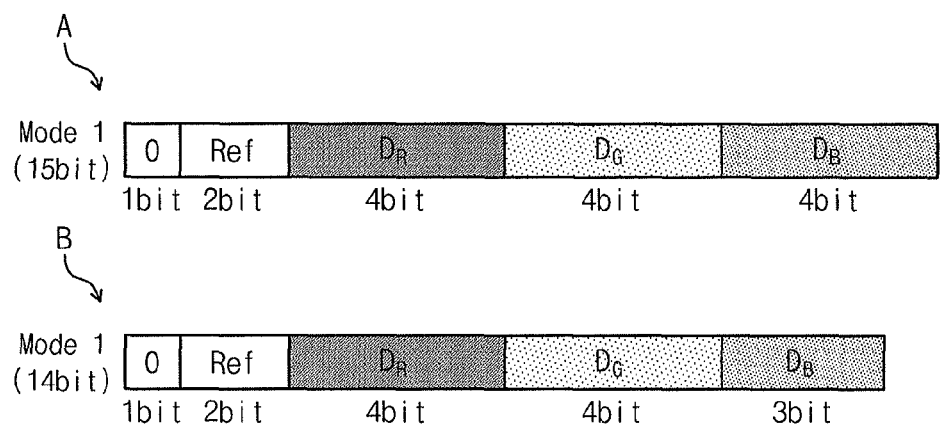
FIGS. 10 and 11 illustrate examples of a compression pixel value output from a compressor.
Figure 11:
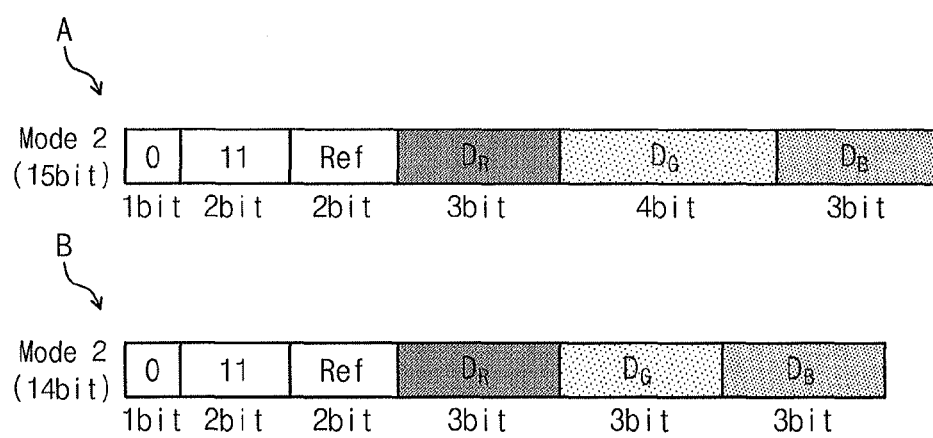

FIGS. 10 and 11 illustrate diagrams for describing a compression pixel value that a second compressor 114 outputs according to one embodiment. FIG. 10 illustrates a compression pixel value when a second compressor 114 is a Mode 1 Encoder in FIG. 5. FIG. 11 illustrates a compression pixel value when the second compressor 114 is a Mode 2 Encoder in FIG. 5. In FIGS. 10 and 11, "A" shows a compression pixel value when the second compressor 114 outputs a 15-bit compression pixel value, and "B" shows a compression pixel value when the second compressor 114 outputs a 14-bit compression pixel value.

In FIGS. 10 and 11, DR, DG, and DB indicate quantization indexes of differences pixel values between compression target pixels and an approximate pixel value of a reference pixel. In FIGS. 10 and 11, "Ref" includes information indicative of a position of a reference pixel determined based on a position of a compression target pixel.

Figure 12:
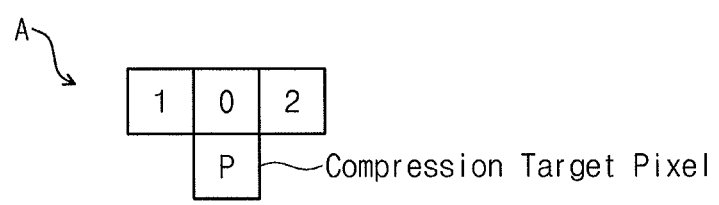
FIG. 12 illustrates an example of a value indicating a position of a reference pixel based on a position of a compression target pixel.
Figure 12:
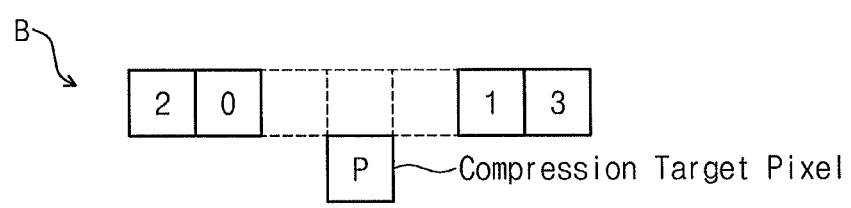

FIG. 12 illustrates a diagram for describing a value indicating a position of a reference pixel based on a position of a compression target pixel according one embodiment. In FIG. 12, "A" shows a value indicating a position of a reference pixel determined depending on a position of a compression target pixel corresponding to Mode 1 in FIG. 6. In FIG. 12, "B" shows a value indicating a position of a reference pixel determined depending on a position of a compression target pixel corresponding to Mode 2 in FIG. 6. The second compressor 114 may quantize a calculated difference D using a table (or database) stored in a storage medium (e.g., ROM) as follows:

(d) specify a range of an input value including the calculated difference D, (e) determine an index corresponding to the specified range of the input value as a compression pixel value, and (f) add an approximate value corresponding to the specified range of the input value to a pixel value P of a compression target pixel and determine the added value as an approximate pixel value.

FIGS. 13 and 14 illustrate example of tables that may be used for processing by a second compressor 114 according to one embodiment. FIG. 13 illustrates an example of a table that may be used when a compression pixel value is formed of four bits as in FIGS. 10 and 11. FIG. 14 illustrates an example of a table that may be used when a compression pixel value is formed of three bits as in FIGS. 10 and 11.

For example, in the case where a pixel value P of a compression target pixel is (R, G, B) (=(750, 250, 500)), a pixel value Q of a reference pixel is (R, G, B) (=(745, 260, 485)), and a second compressor 114 being Mode 2 Encoder outputs a 15-bit compression pixel value. In the Equation 2, a difference D between a pixel value of a compression target pixel and a pixel value of a reference pixel is (DR, DG, DB)=(5, −10, 15).

Also, the second compressor 114 uses the table in FIG. 14 with respect to "DR" and "DB" and the table in FIG. 13 with respect to "DG". In FIG. 14, an index of "DR" is 3 ("011" in binary form), and an approximate value of "DR" is 4. Also, in FIG. 13, an index of "DG" is 6 ("0110" in binary form), and an approximate value of "DG" is −4. Also, in FIG. 14, an index of "DB" is 5 ("0101" in binary form), and an approximate value of "DR" is 16.

Thus, when a pixel value P of a compression target pixel is (R, G, B) (=(750, 250, 500)), a pixel value Q of a reference pixel is (R, G, B) (=(745, 260, 485)), and the second compressor 114 being the Mode 2 Encoder outputs a 15-bit compression pixel value, the second compressor 114 outputs a compression pixel value of "1 11 xx 100 0111 110" in binary form. Also, in the above-described case, the second compressor 114 outputs an approximate pixel value of (745+4, 260−4, 485+16)=(749, 256, 501).

In the second compressor 114, the described method for performing quantization of a difference D is exemplary, and may be performed differently in another embodiment.

A first compression unit 104 includes a compressor 110 having a configuration in FIG. 5. The compressor 110 compresses a pixel value of a compression target pixel by means of correlation between a pixel value of a compression target pixel and an approximate pixel value stored at a memory 102. Also, the configuration of the compressor 110 may be different in another embodiment.

Figure 15:
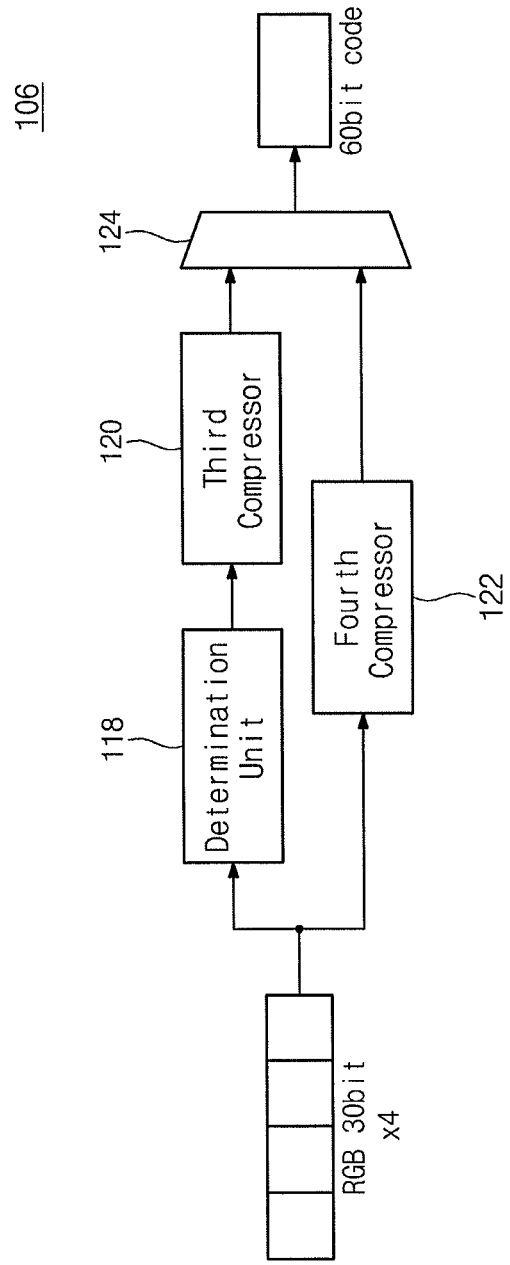
FIG. 15 illustrates another embodiment of a second compressor.

FIG. 15 illustrates an embodiment of the second compression unit 106 which includes a determination unit 118, a third compressor 120, a fourth compressor 122, and a second selector 124.

The third and fourth compressors 120 and 122 act as sub-compressors and are supplied with pixel values of four pixels. Each of the third and fourth compressors 120 and 122 outputs a 60-bit compression code (e.g., a compression pixel value), four approximate pixel values, and a compression error as a compression result. The pixel values of the four pixels provided to the third and fourth compressors 120 and 122 may correspond to, for example, successive pixel values of a plurality of compression target pixels.

The second selector 124 includes, for example, a multiplexer and outputs one (e.g., the smallest compression error) from among compression results of the third and fourth compressors 120 and 122 as a compression result of the second compression unit 106. When compression errors are identical to each other, the second selector 124 may output one of the compression results of the third and fourth compressors 120 and 122 as a compression result of the second compression unit 106 according to a predetermined rule (e.g., random).

When (Rj, Gj, Bj) (j being an integer of 0 through 3) is a pixel value of a compression target pixel and (R'j, G'j, B'j) is a pixel value of an approximate pixel value, a compression error E output from each of the third and fourth compressors 120 and 122 is calculated according to Equation 3.

$$E \sum_{j=0}^{4} (|R_j - R'_j| + |G_j - G'_j| + |B_j - B'_j|) \quad (9)$$

The determination unit 118 determines a type of correlation among pixel values of four pixels, compression target pixels.

Figure 16:
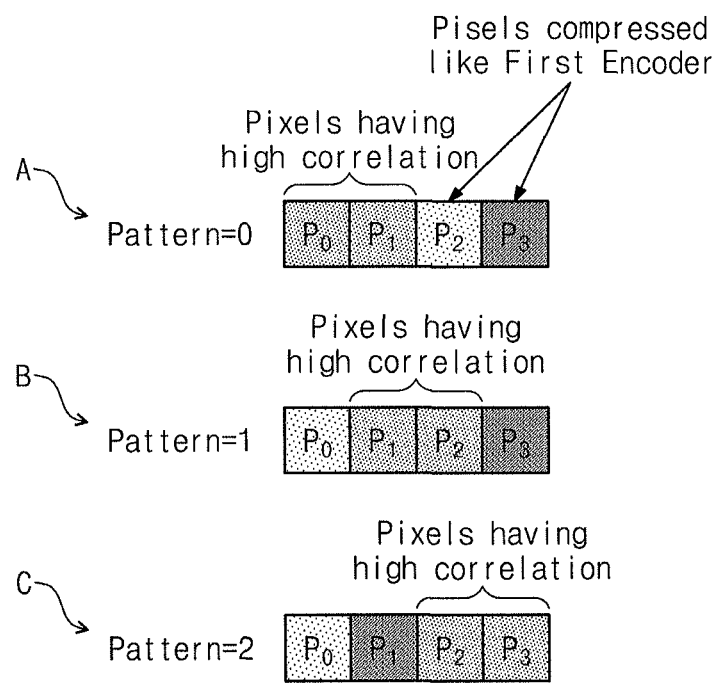
FIG. 16 illustrates examples of correlation patterns of a pixel value.

FIG. 16 illustrates correlation patterns of a pixel value determined by a determination unit 118 of a second compression unit 106 according to one embodiment. In FIG. 16, A, B, and C indicate pattern 0, pattern 1, and pattern 2 determined by a determination unit 118.

The determination unit 118 determines a correlation pattern of a pixel value depending on a combination of pixel values of two pixels, having high correlation (e.g., a correlation above a predetermined reference value), from among received pixel values of four pixels, as in FIG. 16. The determination unit 118 transfers data indicating a determination result and the pixel values of the four pixels to a third compressor 120.

For example, the determination unit 118 calculates a determination difference Ekl between Pk (k being an integer of 0 through 3) and Pl (l being (k+1)), Pk being a pixel value of an adjacent compression target pixel. The determination unit 118 determines a correlation pattern of a pixel value depending on the determination difference Ekl.

The determination difference Ekl is calculated by Equation 4.

$$E_{kl} = |R_k - R_l| + |G_k + G_l| + |B_k + B_l| \quad (4)$$

In Equation 4, Rk, Gk, and Bk are red, green, and blue data of a pixel value Pk, and Rl, Gl, and Bl are red, green, and blue data of a pixel value Pl.

The determination unit 118 determines a pattern depending on the determination difference Ekl. For example, a pattern 0 is determined by the determination unit 118 when the determination difference Ekl satisfies the following condition 1. A pattern 1 is determined by the determination unit 118 when the determination difference Ekl satisfies the following condition 2. A pattern 2 is determined by the determination unit 118 when the determination difference Ekl satisfies the following condition 3. Also, when a plurality of conditions are satisfied, the determination unit 118 determines a satisfactory condition according to a predetermined rule (e.g., random or priority set every condition) and determines a pattern.

Condition 1: (E01≤16) & (E01≤E12) & (E01≤E23)
Condition 2: (E12≤16) & (E12≤E01) & (E12≤E23)
Condition 3: (E23≤16) & (E23≤E01) & (E23≤E01)

The determination unit 118 sends data indicating the determination result to the third compressor 120. The data indicating the determination result may include data indicating a correlation pattern of a pixel value. In one embodiment, the data indicating the determination result may include a value indicating a pattern number or a value that allows identifying a correlation pattern of a pixel value.

When the determination difference Ekl does not satisfy condition 1, condition 2, or condition 3, the determination unit 118 provides the third compressor 120 with data as the determination result. The data may include information indicating that a correlation pattern of a pixel value is not determined. The third compressor 120 does not conduct compression when data is received having information indicating that a correlation pattern of a pixel value is not determined. The third compressor 120 is inactivated by the data having the information indicating that a correlation pattern of a pixel value is not determined.

The third compressor 120 compresses a pixel value of each compression target pixel based on the correlation pattern determined by the determination unit 118. The third compressor 120 outputs pixel values of compression target pixels compressed, approximate pixel values of the compression target pixels, and compression errors as a compression result.

For example, the third compressor 120 selects two pixels having high correlation (e.g., a correlation above a predetermined reference value), from among four pixels (e.g., target pixels to be processed), based on the determined correlation pattern. The third compressor 120 compresses the pixel values of the two pixels having high correlation with the same value.

The third compressor 120 directly compresses, for example, an average value of pixel values of the two pixels having high correlation. The third compressor 120 uses the directly compressed average value of the pixel values of the two pixels having high correlation (which may be, or alternatively may correspond to, a value of an upper bit of the directly compressed average value or a value based on a portion of the directly compressed average value) as compression pixel values of two pixels of which the correlation is high. For example, the third compressor 120 compresses an average value of pixel values of two pixels having a high correlation and outputs a compression result as compression pixel values of two pixels having the high correlation.

In addition, the third compressor 120 de-compresses an average value of pixel values of two pixels having a high correlation and outputs the de-compression result as approximate pixel values of two pixels having the high correlation.

In another embodiment, the third compressor 120 uses a pixel value, obtained by directly compressing a pixel value of one of two pixels having high correlation (e.g., a correlation above a predetermined reference value), as a compression pixel value of the other of the two pixels having high correlation. In this case, the third compressor 120 de-compresses a pixel value obtained by directly compressing a pixel value of one of two pixels having high correlation and outputs the de-compression result as an approximate pixel value in the two pixels having high correlation.

Additionally, or alternatively, the third compressor 120 compresses a pixel value of another pixel, having low correlation, from among four pixels (e.g., compression target pixels) in the same compression method as the first compressor 110. For example, the third compressor 120 may have the same configuration as the first compressor 110 in FIG. 5. Additionally, or alternatively, when the third compressor 120 and the first compressor 110 are electrically connected through signal lines, the third compressor 120 may output a pixel value of a compression target pixel compressed by the first compressor 110. For example, the third compressor 120 may be configured to use a processing result of the first compressor 110.

Figure 17:
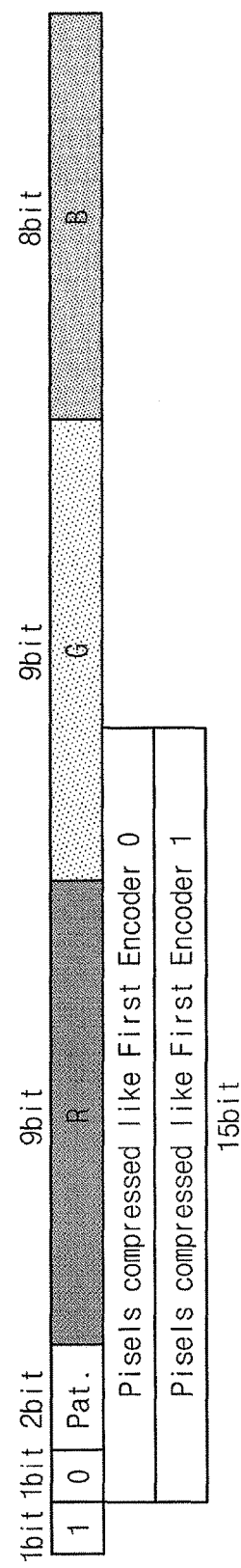
FIG. 17 illustrates an example of a compression pixel value.

FIG. 17 illustrates a compression pixel value output from a third compressor 120 according to one embodiment. In FIG. 17, "Pat." corresponds to data (e.g., a pattern number) that includes information indicative of a correlation pattern of a pixel value transferred from a determination unit 118. Also, in FIG. 17, R, G, and B indicate upper bits of an average value of two pixels having a high correlation, e.g., a correlation above a predetermined reference value.

A third compressor 120 does not perform compression when a correlation pattern among pixel values of four pixels (target pixels to be processed) is not recognized by the determination unit 118.

A fourth compressor 122 outputs compression pixel values, for example, of compression target pixels, approximate pixel values of the compression target pixels, pixel values of the compression target pixels, and a compression error of an approximate pixel value as a compression result.

The fourth compressor 122 conducts direct compression with respect to two compression target pixels, at both ends, from among a plurality of compression target pixels, with an upper bit maintained. Compression pixel values of other compression target pixels are generated by compressing a value obtained by linearly interpolating compression pixel values of the two compression target pixels at both ends.

Figure 18:
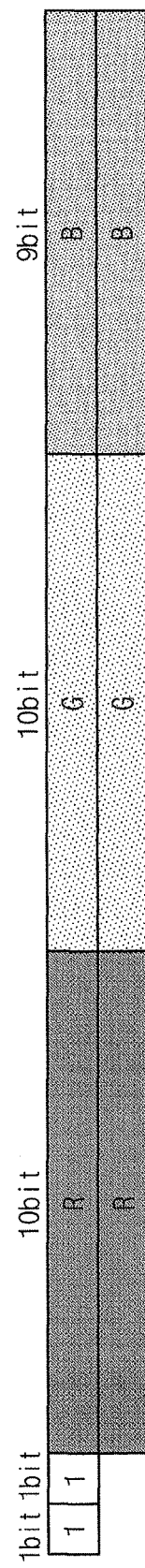
FIG. 18 illustrates an example of a compression pixel value.

FIG. 18 illustrates a compression pixel value output from a fourth compressor 122 according to one embodiment. The fourth compressor 122 de-compresses approximate pixel values of compression target pixels, at both ends, from among a plurality of compression target pixels, for example, a compression pixel value corresponding to each of pixel values of two compression target pixels at both ends.

Also, the fourth compressor 122 calculates approximate values of remaining compression target pixels other than the two compression target pixels at both ends, by performing linear interpolation with respect to approximate pixel values corresponding to the two compression target pixels at both ends.

For example, when P0, P1, P2, and P3 are pixel values of four successive pixels (e.g., compression target pixels) and P'0, P'1, P'2, and P'3 are approximate pixel values corresponding to the four successive pixels, approximate pixel values P'0 and P'3 of two compression target pixels at both ends are obtained by de-compressing pixel values calculated by directly compressing P0 and P3. Also, approximate pixel values P1 and P2 of other compression target pixels are obtained by the Equation 5, for example, based on linear interpolation.

$$\begin{cases} P'_1 = \frac{11}{16}P'_0 + \frac{5}{16}P'_3 \\ P'_2 = \frac{5}{16}P'_0 + \frac{11}{16}P'_3 \end{cases} \quad (5)$$

In another embodiment, linear interpolation may be performed in a different manner. For example, the fourth compressor 122 may use a linear interpolation method in which P0 is multiplied by a first predetermined coefficient (e.g., ⅔) and P3 is multiplied by a second predetermined coefficient (e.g., ⅓).

A second compressor 106 may have a configuration as in FIG. 15, and may perform compression using correlation among pixel values of a predetermined number (e.g. four) compression target pixels (e.g., synchronization with four pixels). In another embodiment, the second compression unit 106 may have a different configuration.

For example, the second compression unit 106 may be configured such that one of the third compressor 120 or the fourth compressor 122. When the third compressor 120 is not included, the second compression unit 106 does not include a determination unit 118. Even though one of the third compressor 120 or the fourth compressor 122 is not included, the second compression unit 106 may perform compression using correlation among pixel values of a predetermined number (e.g., four) compression target pixels (e.g., synchronization with four pixels).

In an other embodiment, the second compression unit 106 may further include one or two or more compressors that conduct compression using correlation among pixel values of a predetermined number (e.g., four) compression target pixels (e.g., synchronization with four pixels). In this embodiment, each of the compressors may use a compression method different from a compression method any other compressor of the second compression unit 106. Also, in this case, the second compression unit 106 may output a compression result of a compressor having a predetermined (e.g., small or smallest error) like in FIG. 15.

Returning to FIG. 3, in accordance with one embodiment, a compression device 100 outputs one (e.g., having a small or smallest error) from among a compression result of a first compression unit 104 and a compression result of a second compression unit 106. In the first compression unit 104, a compression pixel value included in a compression result may be compressed for every pixel value of a plurality compression target pixels, using correlation between approximate pixel values stored in the memory 102. Also, in the second compression unit 106, a compression pixel value included in the compression result may be compressed using correlation between pixel values of plural compression target pixels.

As shown in FIG. 2, for example, even though the compression device 100 processes image data indicating an image where correlation does not exist between pixel values of pixels corresponding to an adjacent line and where correlation between pixel values of pixels corresponding to the same line is low, an image after compression does not deteriorate.

Also, because the compression device 100 does not compress a pixel value of a compression target pixel depending on a compression result of a pixel, processed from among pixels corresponding to the same line, a delay does not occur due to latency that occurs for other methods. Thus, the compression device 100 may be implemented with hardware having high throughput, e.g., according to a configuration as in FIG. 3. Therefore, when compressing image data, the compression device 100 may prevent a decrease in the quality of images after compression.

Also, a configuration of the compression device 100 (e.g., as in FIG. 3) that processes a predetermined number (e.g., four) pixels as compression target pixels is merely exemplary. A configuration of a compression device according to another embodiment may be different from the one in FIG. 3.

Also, in one embodiment, the compression device 100 may include the frame memory 200 and/or the de-compression device 300. For example, the compression device 100 may included in one embodiment of an image data processing system. Also, in one embodiment, the image data processing system may operate as a compression device.

An embodiment of the de-compression device 300 for de-compressing a compression pixel value from the compression device 100 will now be more fully described with reference to FIG. 3. Referring to FIG. 3, the de-compression device 300 de-compresses a 60-bit compression code to image data corresponding to a predetermined number (e.g., four) pixels.

The de-compression device 300 includes a memory 302, a first de-compression unit 304, a second de-compression unit 306, and a selection unit 308. The de-compression unit 300 may include a central processing unit and/or various other processing circuits, and may include a control unit for controlling overall operation of the de-compression device 300.

In one embodiment, the configuration of de-compression device 300 may correspond to that of a compression device 100. For example, the memory 302 of the de-compression device 300 may correspond to the memory 102 of the device 300 may correspond to the memory 102 of the compression device 100. The first de-compression unit 304 of the de-compression device 300 may correspond to the first compression unit 104 of the compression device 100. The second de-compression unit 306 of the de-compression device 300 may correspond to the second compression unit 106 of the compression device 100. The selection unit 308 of the de-compression device 300 may correspond to the selection unit 108 of the compression device 100.

The memory 302 stores a de-compressed pixel value of a pixel belonging to a second line adjacent to a first line corresponding to a reference pixel. De-compression for a pixel value of a pixel corresponding to the second line precedes de-compression for a pixel value of a pixel corresponding to the first line. The memory 302 may be, for example, a line memory that stores pixel values of pixels corresponding, for example, to one or two or more lines.

A de-compression technique performed by the first de-compression unit 304, for example, may be the same as performed by the first compression unit 104. The first de-compression unit 304 de-compresses a pixel value by the reference pixel. The first de-compression unit 304 includes a predetermined number of (e.g., four) de-compressors 310A through 310D (First Decoder in FIG. 3) corresponding to the predetermined number (e.g., four) compressors 110A through 110D (First Encoder in FIG. 3). For example, one of the four de-compressors 310A through 310D receives a 14-bit compression code of a 60-bit compression code, and the others receive a 15-bit compression code of the 60-bit compression code.

A de-compression technique performed by the second de-compression unit 306, for example, may be the same as performed by the second compression unit 106. The second de-compression unit 306 de-compresses pixel values of a plurality of pixels at the same time. In one embodiment, de-compression performed by the second de-compression unit 306 is performed for the four pixels. The 60-bit compression code may be provided to the second de-compression unit 306.

The selection unit 308 outputs a pixel value, de-compressed in a de-compression manner corresponding to a compression manner of the compression device 100, from among a de-compression result from the first de-compression unit 304 and a de-compression result of the second de-compression unit 306. The selection unit 308 outputs a pixel value de-compressed, in a de-compression manner corresponding to a compression manner of the compression device 100, for example, based on an identifier in the 60-bit compression code.

The de-compression device 300 may de-compress a compression result, which is compressed by the compression device 100 and read from the frame memory 200, according to the configuration in FIG. 3. In another embodiment, the de-compression device 300 may have a configuration different from the one in FIG.

In one embodiment, an image data processing system includes any of the aforementioned embodiments of the compression device and/or the decompression device. In other embodiments, communication devices such as television receiver, a display device, a tablet device, a cellular phone, a smartphone, or various other electronic devices including but not limited to image/music replaying devices, game consoles, and computers (e.g., personal or notebook computers) may include any of the aforementioned embodiments of the compression device and/or decompression device. In another embodiment, a processing integrated circuit embedded in the aforementioned devices may perform compression and/or decompression in accordance with any of the aforementioned embodiments.

Also, a compression device, a frame memory, and/or a de-compression device of an image data processing system may be implemented by a plurality of respective devices (or ICs) or may be integrated in one device (or IC).

By way of summation and review, image data compression technique may be performed in a display module having a frame memory. This technique may reduce costs by allowing the frame memory to have reduced capacity or by reducing the width of internal communication data. However, existing compression techniques have limitations.

For example, one technique divides an image into a plurality of blocks and performs compression independently for each block. This technique produces a block boundary that is displayed based on image data that is de-compressed after compression.

Another approach involves compressing a pixel value of a pixel corresponding to a compression target based on a compression result of a pixel, processed from among pixels belonging to a same line, e.g., ones connected to the same gate line. However, this technique produces a latency for calculating a compression result of the pixel. This latency makes it difficult to perform compression in real time.

In accordance with one or more of the aforementioned embodiments, a compression method and device are provided in which a pixel value of a compression target pixel is compressed using pixel values of pixels corresponding to the same line, as well as compression results of pixels processed from among pixels corresponding to a previous line, e.g., the line just before a current line. As a result, the likelihood of block boundaries in the displayed image is reduced or prevented and latency is suppressed to allow for real-time compression.

The methods, processes, and/or operations described herein may be performed by code or instructions to be executed by a compressor, selector, computer, processor, controller, or other signal processing device. The compressor, selector, computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the compressor, selector, computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A compression device, comprising:
   a memory to store reference approximate pixel values as approximate pixel values of reference pixels belonging to a second line adjacent to a first line including compression target pixels of a plurality of pixels;
   a first compressor section to output a result corresponding to one of a first compression result or a second compression result as a middle compression result, the output result having a predetermined compression error, the first compression result including a first compression pixel value generated by compressing pixel values of the compression target pixels without referring to pixel values of pixels belonging to a line different from the first line, and the second compression result including a second compression pixel value generated by compressing pixel values of the compression target pixels based on a correlation among pixel values of the compression target pixels and the reference approximate pixel values;
   a second compressor section to output a third compression result based on a correlation among the pixel values of the compression target pixels; and
   a selector to output one of the middle compression result or the third compression result as a final compression result, the final compression result corresponding to the one of the middle compression result or the third compression result having a predetermined error.

2. The device as claimed in claim 1, wherein the first compressor section includes:
   a first compressor to generate the first compression result;
   a second compressor to generate the second compression result; and
   a first compressor selector to receive the first and second compression results and to output the middle compression result, wherein the first compression result includes first approximate pixel values corresponding to approximate pixel values of the first compression pixel values and compression errors between the first approximate pixel values and pixel values of the compression target pixels,
   wherein the second compression result includes reference differences corresponding to differences between pixel values of the compression target pixels and the reference approximate pixel values, second approximate pixel values as approximate pixel values of the second compression pixel values, and compression errors between pixel values of the compression target pixels and the second approximate pixel values, and
   wherein the second compressor is to compress pixel values of the compression target pixels based on the reference differences to generate the second compression pixel values.

3. The device as claimed in claim 1, wherein the second compressor section includes:
   a plurality of third compressors to perform compression based on the correlation among pixel values of the compression target pixels; and
   a second compressor selector to output one result of compression results of the third compressors as the third compression result, wherein the second compressor selector is to output one of the compression results of the third compressors having a predetermined compression error.

4. The device as claimed in claim 1, wherein the second compressor section includes:
- a determiner to determine a correlation pattern of pixel values of the compression target pixels;
- a third compressor to generate a first sub compression result;
- a fourth compressor to generate a second sub compression result; and
- a second compressor selector to output one of the first or second sub compression results as the third compression result, the output result being a predetermined compression result, wherein the first sub compression result includes:
  - fourth compression pixel values obtained by compressing pixel values of the compression target pixels compressed according to the correlation pattern,
  - fourth approximate pixel values as approximate pixel values of the fourth compression pixel values, and
  - compression errors between pixel values of the compression target pixels and the fourth approximate pixel values.

5. The device as claimed in claim 4, wherein the determiner is to:
- calculate an adjacent difference value between pixel values of two adjacent compression target pixels, and
- determine the correlation pattern based on the adjacent difference value.

6. The device as claimed in claim 4, wherein the third compressor is to:
- calculate an average value of pixel values of first compression target pixels having a predetermined correlation, and
- compress the average value, without referring to pixel values of remaining pixels other than the first compression target pixels, to generate compression pixel values of the first compression target pixels.

7. The device as claimed in claim 4, wherein the third compressor does not perform compression when the determiner determines that the correlation pattern does not exist.

8. The device as claimed in claim 4, wherein the second sub compression result includes:
- fifth pixel values obtained by compressing pixel values of the compression target pixels,
- fifth approximate pixel values as approximate pixel values of the fifth pixel values, and
- compression errors between pixel values of the compression target pixels and the fifth approximate pixel values.

9. The device as claimed in claim 4, wherein:
- the fourth compressor is to compress pixel values of two compression target pixels at respective ends, without referring to pixel values of other pixels, to generate compression pixel values of the two compression target pixels at the respective ends, and
- approximate pixel values of remaining compression target pixels of the compression target pixels, other than the two compression target pixels at the respective ends, are to be generated by linearly interpolating approximate pixel values of compression pixel values of the two compression target pixels at the respective ends.

10. The device as claimed in claim 1, wherein pixel values of the reference pixels are to be compressed prior to pixel values of the compression target pixels.

11. The device as claimed in claim 1, wherein the compression target pixels are successive compression target pixels.

12. The device as claimed in claim 1, wherein the compression error is based on a difference between a pixel value and an approximate pixel value obtained by de-compressing a compression pixel value of the pixel value.

13. A compression method, comprising:
- storing, in a memory, reference approximate pixel values as approximate pixel values of reference pixels corresponding to a second line adjacent to a first line to which compression target pixels of a plurality of pixels belong;
- generating a first compression result including a first compression pixel value generated by compressing pixel values of the compression target pixels without referring to pixel values of pixels, belonging to a line different from the first line;
- generating a second compression result including a second compression pixel value generated by compressing pixel values of the compression target pixels using a correlation among pixel values of the compression target pixels and the reference approximate pixel values;
- outputting one of the first or second compression results as a middle compression result, the output compression result having a first predetermined error;
- outputting a third compression result compressed using a correlation among pixel values of the compression target pixels; and
- outputting one of the middle compression result or the third compression result as a final compression result, the output one of the middle or third compression result having a second predetermined error, wherein at least one compression section generates the first compression result and the second compression result and wherein a selector coupled to the at least one compression section is to output one of the first or second compression results as the middle compression result.

14. A compression device, comprising:
- a first compressor section to generate a first compression result and a second compression result as a middle compression result, and to output one of the first compression result or the second compression result, wherein:
  - (a) the first compression result includes a first compression pixel value generated by compressing pixel values of compression target pixels without referring to pixel values of pixels belonging to a line different from a current line, and
  - (b) the second compression result including a second compression pixel value generated by compressing pixel values of the compression target pixels based on a correlation among pixel values of the compression target pixels and reference approximate pixel values;
- a second compressor section to output a third compression result based on a correlation among the pixel values of the compression target pixels; and
- a selector to output one of the middle compression result or the third compression result as a final compression result.

15. The device as claimed in claim 14, wherein the first compressor section is to output one of the first compression result or the second compression result having a predetermined compression error.

16. The device as claimed in claim 14, wherein the selector is to output one of the middle compression result or the third compression result having a predetermined error.

17. The device as claimed in claim 14, further comprising:

a memory to store the reference approximate pixel values as approximate pixel values of reference pixels belonging to the line different from the current line including the compression target pixels.

18. The device as claimed in claim 17, wherein pixel values of the reference pixels are to be compressed prior to pixel values of the compression target pixels.

19. The device as claimed in claim 14, wherein the first compressor section includes:
   a first compressor to generate the first compression result;
   a second compressor to generate the second compression result; and
   a first compressor selector to output the middle compression result, the first compression result including first approximate pixel values corresponding to approximate pixel values of the first compression pixel values and compression errors between the first approximate pixel values and pixel values of the compression target pixels, the second compression result including reference differences corresponding to differences between pixel values of the compression target pixels and the reference approximate pixel values, second approximate pixel values as approximate pixel values of the second compression pixel values, and compression errors between pixel values of the compression target pixels and the second approximate pixel values, and wherein the second compressor is to compress pixel values of the compression target pixels based on the reference differences to generate the second compression pixel values.

20. The device as claimed in claim 19, wherein the second compressor section includes:
   a plurality of third compressors to perform compression based on the correlation among pixel values of the compression target pixels; and
   a second compressor selector to output one of compression results of the third compressors as the third compression result, wherein the second compressor selector is to output one of the compression results of the third compressors having a predetermined compression error.

* * * * *